United States Patent
Alidedeoglu et al.

(10) Patent No.: US 11,535,710 B2
(45) Date of Patent: Dec. 27, 2022

(54) SINGLE LAYER POLYMER FILMS AND ELECTRONIC DEVICES

(71) Applicant: DUPONT ELECTRONICS, INC., Wilmington, DE (US)

(72) Inventors: Husnu Alp Alidedeoglu, New Albany, OH (US); Thomas Edward Carney, Orient, OH (US); Joseph Casey Johnson, Pickerington, OH (US); Lin Ju, Grove City, OH (US); Michael Thomas Kwasny, Columbus, OH (US); Laila MacLaughlin, Stoutsville, OH (US); Grzegorz Slawinski, Fairborn, OH (US)

(73) Assignee: DUPONT ELECTRONICS, INC.

( * ) Notice: Subject to any disclaimer, the term of this patent is extended or adjusted under 35 U.S.C. 154(b) by 113 days.

(21) Appl. No.: 17/197,887

(22) Filed: Mar. 10, 2021

(65) Prior Publication Data

US 2021/0301086 A1  Sep. 30, 2021

Related U.S. Application Data

(60) Provisional application No. 63/000,759, filed on Mar. 27, 2020.

(51) Int. Cl.

| | | |
|---|---|---|
| *C08G 73/10* | (2006.01) | |
| *C08K 3/04* | (2006.01) | |
| *C08K 5/00* | (2006.01) | |
| *C08K 5/17* | (2006.01) | |
| *C08L 79/08* | (2006.01) | |
| *C08J 5/18* | (2006.01) | |

(52) U.S. Cl.
CPC ..... *C08G 73/1067* (2013.01); *C08G 73/1028* (2013.01); *C08J 5/18* (2013.01); *C08K 3/04* (2013.01); *C08K 5/0025* (2013.01); *C08K 5/17* (2013.01); *C08L 79/08* (2013.01); *C08J 2333/24* (2013.01); *C08L 2203/16* (2013.01); *C08L 2203/206* (2013.01)

(58) Field of Classification Search
CPC . C08L 79/08; C08L 2203/16; C08G 73/1028; C08J 5/18; C08J 2379/08
See application file for complete search history.

(56) References Cited

U.S. PATENT DOCUMENTS

| | | | |
|---|---|---|---|
| 9,469,781 B2 | 10/2016 | Carney et al. | |
| 9,481,150 B2 | 11/2016 | Carney et al. | |
| 9,481,809 B2 | 11/2016 | Carney et al. | |
| 2012/0251095 A1* | 10/2012 | Ono | G02B 5/003 359/227 |
| 2020/0062995 A1 | 2/2020 | Myung et al. | |

FOREIGN PATENT DOCUMENTS

KR   10-1906393   * 10/2018

OTHER PUBLICATIONS

Terui et al., "Coefficients of Molecular Packing and Intrinsic Birefringence of Aromatic Polyimides Estimated Using Refractive Indices and Molecular Polarizabilities," J Polym Sci: Part B Polymer Physics, 42, 2354-2366 (2004).

* cited by examiner

*Primary Examiner* — Gregory Listvoyb

(57) ABSTRACT

In a first aspect, a single layer polymer film includes 60 to 99 wt % of a crosslinked polyimide, having a gel fraction in the range of from 20 to 100% and a refractive index of 1.74 or less, and 1 to 40 wt % of a colorant. A surface of the single layer polymer film has been textured and has a maximum roughness ($S_{pv}$) of 6 μm or more, an L* color of 30 or less and a 60° gloss of 15 or less. In a second aspect, a coverlay for a printed circuit board includes the single layer polymer film of the first aspect. In third and fourth aspects, processes are disclosed for forming a single layer polymer film including a crosslinked polyimide film including a dianhydride and a diamine.

14 Claims, No Drawings

SINGLE LAYER POLYMER FILMS AND ELECTRONIC DEVICES

FIELD OF DISCLOSURE

The field of this disclosure is single layer polymer films, coverlays and electronic devices, and processes for forming the same.

BACKGROUND OF THE DISCLOSURE

Industry increasingly desires polyimide films for electronic application to be matte in appearance, have a specific color, durability to handling and circuit processing, and when used as a coverlay, provide security against unwanted visual inspection of the electronic components protected by the coverlay. Single layer matte luster films do not have an L* color less than 30 providing deep, rich saturated colors desired by industry. Typically, as the amount of matting agent is increased the color of the film becomes muted. The effect of increased surface roughness from the matting agent is the dilution of the pigment color so that it appears lighter and less saturated. This is caused by the dilution of the diffuse reflectance (where pigment color is perceived) by the increased scatter of the specular reflectance (white light). The rougher the surface, the lower the gloss and greater the scatter of the specular reflectance. Thus, as gloss decreases, L* (lightness) typically increases. Adding more colorant does not decrease the L* color. Thus, simultaneously achieving low gloss and low L* color is difficult. To overcome these challenges, U.S. Pat. Nos. 9,469,781, 9,481,150 and 9,481,809 use a multilayer structure in which a thin polyimide layer incorporating blends of matting agents, carbon black and submicron particles is adhered to a thicker base polyimide layer, such that the multilayer film is able to achieve the desired combination of both low L* color and low gloss.

The success of multilayer coverlay in the circuit production depends on the etching thickness during the pumice, desmear, and plasma processes. With the very thin outer layer of a multilayer film, there is a risk of etching the outer layer of the film during these processes, exposing the base layer, which can result in significant gloss and color changes. Therefore, the outer layer must be sufficiently thick to withstand removal during these processes.

As electronic devices and their electronic components become increasingly thin and compact, the challenge to form a coverlay with both low gloss and low color becomes even more difficult. In some cases, the need for thinner coverlays limits the use of matting agents, which may have particle sizes on the order of the thickness of the film, as well as limiting the overall thicknesses of the layers in a multilayer coverlay. A need exists for a single layer polymer film that is matte in appearance, has deep, rich saturated colors, as well as providing sufficient optical density to provide visual security when used as a coverlay while having acceptable electrical properties (e.g., dielectric strength) mechanical properties, and durability to handling and circuit processing. This film should also be more resistive against post treatment etching processes.

SUMMARY

In a first aspect, a single layer polymer film includes 60 to 99 wt % of a crosslinked polyimide, having a gel fraction in the range of from 20 to 100% and a refractive index of 1.74 or less, and 1 to 40 wt % of a colorant. A surface of the single layer polymer film has been textured and has a maximum roughness ($S_{pv}$) of 6 μm or more, an L* color of 30 or less and a 60° gloss of 15 or less.

In a second aspect, a coverlay for a printed circuit board includes the single layer polymer film of the first aspect.

In a third aspect, a process is disclosed for forming a single layer polymer film including a crosslinked polyimide film including a dianhydride and a diamine. The dianhydride, the diamine or both the dianhydride and the diamine include an alicyclic monomer, an aliphatic monomer or both an alicyclic monomer and an aliphatic monomer. The polymer film has an L* color of 30 or less and a 60° gloss of 15 or less. The crosslinked polyimide film is formed by:

(a) polymerizing the dianhydride and the diamine in the presence of a solvent to obtain a polyamic acid solution;

(b) imidizing the polyamic acid solution to form a substantially imidized solution;

(c) adding a crosslinking agent and a colorant to the substantially imidized solution;

(d) casting the substantially imidized solution on a removeable substrate having a textured surface with a maximum roughness ($S_{pv}$) of 6 μm or more to form a film;

(e) crosslinking the polyimide while drying the film; and (f) removing the single layer polymer film from the textured substrate.

In a fourth aspect, a process is disclosed for forming a single layer polymer film including a crosslinked polyimide film including a dianhydride and a diamine. The dianhydride, the diamine or both the dianhydride and the diamine comprise an alicyclic monomer, an aliphatic monomer or both an alicyclic monomer and an aliphatic monomer. The polymer film has an L* color of 30 or less and a 60° gloss of 15 or less. The crosslinked polyimide film is formed by:

(a) polymerizing the dianhydride and the diamine in the presence of a first solvent to obtain a polyamic acid solution;

(b) imidizing the polyamic acid solution to form a first substantially imidized solution;

(c) precipitating the first substantially imidized solution with an antisolvent;

(d) filtering and drying the first substantially imidized solution to obtain a solid polyimide resin;

(e) dissolving the solid polyimide resin in a second solvent and adding a crosslinking agent and a low conductivity carbon black to form a second substantially imidized solution;

(f) casting the second substantially imidized solution on a removeable substrate having a textured surface with a maximum roughness ($S_{pv}$) of 6 μm or more to form a film;

(g) crosslinking the polyimide while drying the film; and (h) removing the single layer polymer film from the textured substrate.

The foregoing general description and the following detailed description are exemplary and explanatory only and are not restrictive of the invention, as defined in the appended claims.

DETAILED DESCRIPTION

In a first aspect, a single layer polymer film includes 60 to 99 wt % of a crosslinked polyimide, having a gel fraction in the range of from 20 to 100% and a refractive index of 1.74 or less, and 1 to 40 wt % of a colorant. A surface of the single layer polymer film has been textured and has a maximum roughness ($S_{pv}$) of 6 μm or more, an L* color of 30 or less and a 60° gloss of 15 or less.

In one embodiment of the first aspect, the single layer polymer film further includes a matting agent.

In another embodiment of the first aspect, the crosslinked polyimide includes a dianhydride selected from the group consisting of aromatic dianhydrides, aliphatic dianhydrides and mixtures thereof. In a specific embodiment, the dianhydride is selected from the group consisting of 4,4'-(hexafluoroisopropylidene) diphthalic anhydride (6FDA), cyclobutane dianhydride (CBDA), 3,3',4,4'-benzophenone tetracarboxylic dianhydride (BTDA), bisphenol A dianhydride (BPADA), 4,4'-oxydiphthalic anhydride (ODPA), bis (3,4-dicarboxyphenyl) sulfoxide dianhydride (DSDA) and hexahydro-4,8-ethano-1H,3H-benzo[1,2-c:4,5-c']difuran-1,3,5,7-tetrone (BODA) and mixtures thereof.

In yet another embodiment of the first aspect, the crosslinked polyimide includes a diamine selected from the group consisting of aromatic diamines, aliphatic diamines and mixtures thereof. In a specific embodiment, the diamine is selected from the group consisting of 1,6-hexamethylenediamine (HMD), trans-1,4-diaminocyclohexane (CHDA), 3-(4-aminophenyl)-1,1,3-trimethyl-5-indanamine (PIDA), isophoronediamine (IPDA), m-tolidine (MTB), 2,2'-bis(trifluoromethyl) benzidine (TFMB), m-phenylenediamine (MPD), 1,3-bis-(4-aminophenoxy) benzene (RODA), 2,2-bis-(4-[4-aminophenoxy]phenyl) propane (BAPP), and 3,4'-diaminodiphenyl ether (3,4-ODA) and mixtures thereof.

In still another embodiment of the first aspect, the single layer polymer film has a thickness in the range of from 2 to 125 µm.

In still yet another embodiment of the first aspect, the crosslinked polyimide has a refractive index of 1.69 or less.

In a further embodiment of the first aspect, the colorant includes a low conductivity carbon black.

In a second aspect, a coverlay for a printed circuit board includes the single layer polymer film of the first aspect.

In a third aspect, a process is disclosed for forming a single layer polymer film including a crosslinked polyimide film including a dianhydride and a diamine. The dianhydride, the diamine or both the dianhydride and the diamine include an alicyclic monomer, an aliphatic monomer or both an alicyclic monomer and an aliphatic monomer. The polymer film has an L* color of 30 or less and a 60° gloss of 15 or less. The crosslinked polyimide film is formed by:

(a) polymerizing the dianhydride and the diamine in the presence of a solvent to obtain a polyamic acid solution;

(b) imidizing the polyamic acid solution to form a substantially imidized solution;

(c) adding a crosslinking agent and a colorant to the substantially imidized solution;

(d) casting the substantially imidized solution on a removeable substrate having a textured surface with a maximum roughness ($S_{pv}$) of 6 µm or more to form a film;

(e) crosslinking the polyimide while drying the film; and (f) removing the single layer polymer film from the textured substrate.

In a fourth aspect, a process is disclosed for forming a single layer polymer film including a crosslinked polyimide film including a dianhydride and a diamine. The dianhydride, the diamine or both the dianhydride and the diamine comprise an alicyclic monomer, an aliphatic monomer or both an alicyclic monomer and an aliphatic monomer. The polymer film has an L* color of 30 or less and a 60° gloss of 15 or less. The crosslinked polyimide film is formed by:

(a) polymerizing the dianhydride and the diamine in the presence of a first solvent to obtain a polyamic acid solution;

(b) imidizing the polyamic acid solution to form a first substantially imidized solution;

(c) precipitating the first substantially imidized solution with an antisolvent;

(d) filtering and drying the first substantially imidized solution to obtain a solid polyimide resin;

(e) dissolving the solid polyimide resin in a second solvent and adding a crosslinking agent and a low conductivity carbon black to form a second substantially imidized solution;

(f) casting the second substantially imidized solution on a removeable substrate having a textured surface with a maximum roughness ($S_{pv}$) of 6 µm or more to form a film;

(g) crosslinking the polyimide while drying the film; and (h) removing the single layer polymer film from the textured substrate.

In one embodiment of the process of the fourth aspect, after (e) and before (f), the second substantially imidized solution is filtered to remove insoluble constituents of the solution.

In another embodiment of the process of the fourth aspect, the first and second solvents are the same or different.

Many aspects and embodiments have been described above and are merely exemplary and not limiting. After reading this specification, skilled artisans appreciate that other aspects and embodiments are possible without departing from the scope of the invention. Other features and advantages of the invention will be apparent from the following detailed description, and from the claims.

In one embodiment, a single layer polymer film having a crosslinked polyimide enables the formation of a very thin coverlay that is more resistant to etching than films using conventional coverlay materials. Using a soluble polyimide that is crosslinked after film formation results in a single layer polymer film with improved chemical resistance that maintains the low L* color and low gloss properties needed for these films.

Depending upon context, "diamine" as used herein is intended to mean: (i) the unreacted form (i.e., a diamine monomer); (ii) a partially reacted form (i.e., the portion or portions of an oligomer or other polymer precursor derived from or otherwise attributable to diamine monomer) or (iii) a fully reacted form (the portion or portions of the polymer derived from or otherwise attributable to diamine monomer). The diamine can be functionalized with one or more moieties, depending upon the particular embodiment selected in the practice of the present invention.

Indeed, the term "diamine" is not intended to be limiting (or interpreted literally) as to the number of amine moieties in the diamine component. For example, (ii) and (iii) above include polymeric materials that may have two, one, or zero amine moieties. Alternatively, the diamine may be functionalized with additional amine moieties (in addition to the amine moieties at the ends of the monomer that react with dianhydride to propagate a polymeric chain). Such additional amine moieties could be used to crosslink the polymer or to provide other functionality to the polymer.

Similarly, the term "dianhydride" as used herein is intended to mean the component that reacts with (is complimentary to) the diamine and in combination is capable of reacting to form an intermediate (which can then be cured into a polymer). Depending upon context, "anhydride" as used herein can mean not only an anhydride moiety per se, but also a precursor to an anhydride moiety, such as: (i) a pair of carboxylic acid groups (which can be converted to anhydride by a de-watering or similar-type reaction); or (ii) an acid halide (e.g., chloride) ester functionality (or any other functionality presently known or developed in the future which is) capable of conversion to anhydride functionality.

Depending upon context, "dianhydride" can mean: (i) the unreacted form (i.e. a dianhydride monomer, whether the anhydride functionality is in a true anhydride form or a precursor anhydride form, as discussed in the prior above paragraph); (ii) a partially reacted form (i.e., the portion or portions of an oligomer or other partially reacted or precursor polymer composition reacted from or otherwise attributable to dianhydride monomer) or (iii) a fully reacted form (the portion or portions of the polymer derived from or otherwise attributable to dianhydride monomer).

The dianhydride can be functionalized with one or more moieties, depending upon the particular embodiment selected in the practice of the present invention. Indeed, the term "dianhydride" is not intended to be limiting (or interpreted literally) as to the number of anhydride moieties in the dianhydride component. For example, (i), (ii) and (iii) (in the paragraph above) include organic substances that may have two, one, or zero anhydride moieties, depending upon whether the anhydride is in a precursor state or a reacted state. Alternatively, the dianhydride component may be functionalized with additional anhydride type moieties (in addition to the anhydride moieties that react with diamine to provide a polymer). Such additional anhydride moieties could be used to crosslink the polymer or to provide other functionality to the polymer.

Any one of a number of polyimide manufacturing processes may be used to prepare single layer polymer films. It would be impossible to discuss or describe all possible manufacturing processes useful in the practice of the present invention. It should be appreciated that the monomer systems of the present invention are capable of providing the above-described advantageous properties in a variety of manufacturing processes. The compositions of the present invention can be manufactured as described herein and can be readily manufactured in any one of many (perhaps countless) ways of those of ordinarily skilled in the art, using any conventional or non-conventional manufacturing technology.

Although methods and materials similar or equivalent to those described herein can be used in the practice or testing of the present invention, suitable methods and materials are described herein.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In describing certain polymers, it should be understood that sometimes applicants are referring to the polymers by the monomers used to make them or the amounts of the monomers used to make them. While such a description may not include the specific nomenclature used to describe the final polymer or may not contain product-by-process terminology, any such reference to monomers and amounts should be interpreted to mean that the polymer is made from those monomers or that amount of the monomers, and the corresponding polymers and compositions thereof.

The materials, methods, and examples herein are illustrative only and, except as specifically stated, are not intended to be limiting.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Organic Solvents

Useful organic solvents for the synthesis of the polymers of the present invention are preferably capable of dissolving the polymer precursor materials. Such a solvent should also have a relatively low boiling point, such as below 225° C., so the polymer can be dried at moderate (i.e., more convenient and less costly) temperatures. A boiling point of less than 210, 205, 200, 195, 190, or 180° C. is preferred.

Solvents of the present invention may be used alone or in combination with other solvents (i.e., cosolvents). Useful organic solvents include: N-methylpyrrolidone (NMP), dimethyl acetamide (DMAc), N,N'-dimethyl-formamide (DMF), dimethyl sulfoxide (DMSO), tetramethyl urea (TMU), diethyleneglycol diethyl ether, 1,2-dimethoxyethane (monoglyme), diethylene glycol dimethyl ether (diglyme), 1,2-bis-(2-methoxyethoxy) ethane (triglyme), bis [2-(2-methoxyethoxy) ethyl)] ether (tetraglyme), gamma-butyrolactone, and bis-(2-methoxyethyl) ether, tetrahydrofuran. In one embodiment, preferred solvents include N-methylpyrrolidone (NMP) and dimethyl acetamide (DMAc).

Co-solvents can generally be used at about 5 to 50 weight percent of the total solvent, and useful such co-solvents include xylene, toluene, benzene, "Cellosolve" (glycol ethyl ether), and "Cellosolve acetate" (hydroxyethyl acetate glycol monoacetate).

Diamines

In one embodiment, a suitable diamine for forming a polyimide can include an aliphatic diamine, such as 1,2-diaminoethane, 1,6-diaminohexane (HMD), 1,4-diaminobutane, 1,7-diaminoheptane, 1,8-diaminooctane, 1,9-diaminononane, 1,10-diaminodecane (DMD), 1,11-diaminoundecane, 1,12-diaminododecane (DDD), 1,16-hexadecamethylenediamine, 1,3-bis(3-aminopropyl)-tetramethyldisiloxane, trans-1,4-diaminocyclohexane (CHDA), isophoronediamine (IPDA), bicyclo[2.2.2]octane-1,4-diamine and combinations thereof. Other aliphatic diamines suitable for practicing the invention include those having six to twelve carbon atoms or a combination of longer chain and shorter chain diamines so long as both developability and flexibility are maintained. Long chain aliphatic diamines increase flexibility.

In one embodiment, a suitable diamine for forming the polyimide can further include a fluorinated aromatic diamine, such as 2,2'-bis(trifluoromethyl) benzidine (TFMB), trifluoromethyl-2,4-diaminobenzene, trifluoromethyl-3,5-diaminobenzene, 2,2'-bis-(4-aminophenyl)-hexafluoro propane, 4,4'-diamino-2,2'-trifluoromethyl diphenyloxide, 3,3'-diamino-5,5'-trifluoromethyl diphenyloxide, 9.9'-bis(4-aminophenyl)fluorene, 4,4'-trifluoromethyl-2,2'-diaminobiphenyl, 4,4'-oxy-bis-[2-trifluoromethyl)benzene amine] (1,2,4-OBABTF), 4,4'-oxy-bis-[3-trifluoromethyl)benzene amine], 4,4'-thio-bis-[(2-trifluoromethyl)benzene-amine], 4,4'-thiobis[(3-trifluoromethyl)benzene amine], 4,4'-sulfoxyl-bis-[(2-trifluoromethyl)benzene amine, 4,4'-sulfoxyl-bis-[(3-trifluoromethyl)benzene amine], 4,4'-keto-bis-[(2-trifluoromethyl)benzene amine], 1,1-bis[4'-(4''-amino-2''-trifluoromethylphenoxy)phenyl]cyclopentane, 1,1-bis[4'-(4''-amino-2''-trifluoromethylphenoxy)phenyl]cyclohexane, 2-trifluoromethyl-4,4'-diaminodiphenyl ether; 1,4-(2'-trifluoromethyl-4',4''-diaminodiphenoxy)-benzene, 1,4-bis(4'-aminophenoxy)-2-[(3',5'-ditrifluoromethyl)phenyl]benzene, 1,4-bis[2'-cyano-3'("4-amino phenoxy)phenoxy]-2-[(3',5'-ditrifluoro-methyl)phenyl]benzene (6FC-diamine), 3,5-di-amino-4-methyl-2',3',5',6'-tetrafluoro-4'-tri-fluoromethyldiphenyloxide, 2,2-Bis[4'(4''-aminophenoxy)phenyl] phthalein-3',5'-bis(trifluoromethyl)anilide (6FADAP) and 3,3',5,5'-tetrafluoro-4,4'-diamino-diphenylmethane (TFDAM). In a specific embodiment, the fluorinated diamine is 2,2'-bis(trifluoromethyl) benzidine (TFMB). In one embodiment, a fluorinated aromatic diamine can be present in a range of from 40 to 95 mole percent, based on the total diamine content of the polyimide. In a more specific embodiment, the fluorinated aromatic diamine can be present in a range of from 50 to 75 mole percent, based on the total diamine content of the polyimide.

In one embodiment, any number of additional diamines can be used in forming the polyimide, including p-phenylenediamine (PPD), m-tolidine (MTB), m-phenylenediamine (MPD), 3-(4-aminophenyl)-1,1,3-trimethyl-5-indanamine (PIDA), 2,5-dimethyl-1,4-diaminobenzene, 2,5-dimethyl-1,4-phenylenediamine (DPX), 2,2-bis-(4-aminophenyl) propane, 1,4-naphthalenediamine,1,5-naphthalenediamine, 4,4'-diaminobiphenyl, 4,4''-diamino terphenyl, 4,4'-diamino benzanilide, 4,4'-diaminophenyl benzoate, 4,4'-diaminobenzophenone, 4,4'-diaminodiphenylmethane (MDA), 4,4'-diaminodiphenyl sulfide, 4,4'-diaminodiphenyl sulfone, 3,3'-diaminodiphenyl sulfone, bis-(4-(4-aminophenoxy)phenyl sulfone (BAPS), 4,4'-bis-(aminophenoxy)biphenyl (BAPB), 4,4'-diaminodiphenyl ether (ODA), 3,4'-diaminodiphenyl ether (3,4-ODA), 4,4'-diaminobenzophenone, 4,4'-isopropylidenedianiline, 2,2'-bis-(3-aminophenyl)propane, N,N-bis-(4-aminophenyl)-n-butylamine, N,N-bis-(4-aminophenyl) methylamine, 1,5-diaminonaphthalene, 3,3'-dimethyl-4,4'-diaminobiphenyl, m-amino benzoyl-p-amino anilide, 4-aminophenyl-3-aminobenzoate, N,N-bis-(4-aminophenyl) aniline, 2,4-diaminotoluene, 2,5-diaminotoluene, 2,6-diaminotoluene, 2,4-diamine-5-chlorotoluene, 2,4-diamine-6-chlorotoluene, 2,4-bis-(beta-amino-t-butyl) toluene, bis-(p-beta-amino-t-butyl phenyl) ether, p-bis-2-(2-methyl-4-aminopentyl) benzene, m-xylylene diamine, and p-xylylene diamine.

Other useful diamines include 1,2-bis-(4-aminophenoxy) benzene, 1,3-bis-(4-aminophenoxy) benzene (RODA), 1,2-bis-(3-aminophenoxy)benzene, 1,3-bis-(3-aminophenoxy) benzene, 1-(4-aminophenoxy)-3-(3-aminophenoxy) benzene, 1,4-bis-(4-aminophenoxy) benzene, 1,4-bis-(3-aminophenoxy) benzene, 1-(4-aminophenoxy)-4-(3-aminophenoxy) benzene, 2,2-bis-(4-[4-aminophenoxy]phenyl) propane (BAPP), 2,2'-bis-(4-phenoxy aniline) isopropylidene, 2,4,6-trimethyl-1,3-diaminobenzene and 2,4,6-trimethyl-1,3-diaminobenzene.

Dianhydrides

In one embodiment, any number of suitable dianhydrides can be used in forming a polyimide. The dianhydrides can be used in their tetra-acid form (or as mono, di, tri, or tetra esters of the tetra acid), or as their diester acid halides (chlorides). However, in some embodiments, the dianhydride form can be preferred, because it is generally more reactive than the acid or the ester.

Examples of suitable dianhydrides include 3,3',4,4'-biphenyl tetracarboxylic dianhydride (BPDA), 1,2,5,6-naphthalene tetracarboxylic dianhydride, 1,4,5,8-naphthalene tetracarboxylic dianhydride, 2,3,6,7-naphthalene tetracarboxylic dianhydride, 2-(3',4'-dicarboxyphenyl) 5,6-dicarboxybenzimidazole dianhydride, 2-(3',4'-dicarboxyphenyl) 5,6-dicarboxybenzoxazole dianhydride, 2-(3',4'-dicarboxyphenyl) 5,6-dicarboxybenzothiazole dianhydride, 2,2',3,3'-benzophenone tetracarboxylic dianhydride, 2,3,3',4'-benzophenone tetracarboxylic dianhydride, 3,3',4,4'-benzophenone tetracarboxylic dianhydride (BTDA), 2,2',3,3'-biphenyl tetracarboxylic dianhydride, 2,3,3',4'-biphenyl tetracarboxylic dianhydride, bicyclo-[2,2,2]-octen-(7)-2,3,5,6-tetracarboxylic-2,3,5,6-dianhydride, 4,4'-thio-diphthalic anhydride, bis (3,4-dicarboxyphenyl) sulfone dianhydride, bis (3,4-dicarboxyphenyl) sulfoxide dianhydride (DSDA), bis (3,4-dicarboxyphenyl oxadiazole-1,3,4) p-phenylene dianhydride, bis (3,4-dicarboxyphenyl) 2,5-oxadiazole 1,3,4-dianhydride, bis 2,5-(3',4'-dicarboxydiphenylether) 1,3,4-oxadiazole dianhydride, 4,4'-oxydiphthalic anhydride (ODPA), bis (3,4-dicarboxyphenyl) thio ether dianhydride, bisphenol A dianhydride (BPADA), bisphenol S dianhydride, bis-1,3-isobenzofurandione, 1,4-bis(4,4'-oxyphthalic anhydride) benzene, bis (3,4-dicarboxyphenyl) methane dianhydride, cyclopentadienyl tetracarboxylic acid dianhydride, cyclopentane tetracarboxylic dianhydride, ethylene tetracarboxylic acid dianhydride, perylene 3,4,9,10-tetracarboxylic dianhydride, pyromellitic dianhydride (PMDA), tetrahydrofuran tetracarboxylic dianhydride, 1,3-bis-(4,4'-oxydiphthalic anhydride) benzene, 2,2-bis(3,4-dicarboxyphenyl) propane dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene-1,8,9,10-tetracarboxylic dianhydride, pyrazine-2,3,5,6-tetracarboxylic dianhydride, benzene-1,2,3,4-tetracarboxylic dianhydride and thiophene-2,3,4,5-tetracarboxylic dianhydride.

In one embodiment, a suitable dianhydride can include an alicyclic dianhydride, such as cyclobutane dianhydride (CBDA), cyclohexane dianhydride, 1,2,3,4-cyclopentanetetracarboxylic dianhydride (CPDA), hexahydro-4,8-ethano-1H,3H-benzo[1,2-c:4,5-c']difuran-1,3,5,7-tetrone (BODA), 3-(carboxymethyl)-1,2,4-cyclopentanetricarboxylic acid 1,4:2,3-dianhydride (TCA) and meso-butane-1,2,3,4-tetracarboxylic acid dianhydride.

In one embodiment, a suitable dianhydride for forming the polyimide can include a fluorinated dianhydride, such as 4,4'-(hexafluoroisopropylidene)diphthalic anhydride (6FDA) and 9,9-bis (triuoromethyl)-2,3,6,7-xanthene tetracarboxylic dianhydride.

Crosslinking Agents

In one embodiment, crosslinking agents are used in the polymer film. By crosslinking the polyimide, the polymer film may have improved mechanical properties, as well as improved chemical resistance. Crosslinking agents can include polyetheramines, such as Jeffamine® D-230, Jeffamine® D-400, Jeffamine® D-2000, Jeffamine® D-2010, Jeffamine® D-4000, Jeffamine® ED-600, Jeffamine® ED-900, Jeffamine® D-2003, Jeffamine® EDR-148, Jeffamine® THF-100, Jeffamine® THF-170, Jeffamine®

SD-2001, Jeffamine® D-205 and Jeffamine® RFD-270, secondary amines, such as piperazine, N,N'-diisopropylethylenediamine, N,N'-diisopropyl-1,3-propanediamine and N,N'-dimethyl-1,3-propanediamine, and triamines, such as 2,4,6-triaminopyrimidine (TAP), melamine, diethylenetriamine, Jeffamine® T-403, Jeffamine® T-3000, Jeffamine® T-5000. In addition, many diamines that may be used as a diamine monomer for polyimides, as described above, may also be useful as crosslinking agents.

Colorants

In one embodiment, the polymer film contains about 1 to about 40 wt % of a colorant, such as a pigment or dye. In some embodiments, the polymer film contains about 1 to about 40 wt % of a mixture of pigments and dyes. In some embodiments, the polymer film contains between and including any two of the following: 1, 5, 10, 15, 20, 25, 30, 35 and 40 wt % colorant.

Virtually any pigment (or combination of pigments) can be used in the performance of the present invention. In some embodiments, useful pigments include but are not limited to the following: Barium Lemon Yellow, Cadmium Yellow Lemon, Cadmium Yellow Lemon, Cadmium Yellow Light, Cadmium Yellow Middle, Cadmium Yellow Orange, Scarlet Lake, Cadmium Red, Cadmium Vermilion, Alizarin Crimson, Permanent Magenta, Van Dyke brown, Raw Umber Greenish, or Burnt Umber. In some embodiments, useful black pigments include: cobalt oxide, Fe—Mn—Bi black, Fe—Mn oxide spinel black, (Fe, Mn)$_2$O$_3$ black, copper chromite black spinel, lampblack, bone black, bone ash, bone char, hematite, black iron oxide, micaceous iron oxide, black complex inorganic color pigments (CICP), (Ni,Mn,Co)(Cr,Fe)$_2$O$_4$ black, Aniline black, Perylene black, Anthraquinone black, Chromium Green-Black Hematite, Chrome Iron Oxide, Pigment Green 17, Pigment Black 26, Pigment Black 27, Pigment Black 28, Pigment Brown 29, Pigment Brown 35, Pigment Black 30, Pigment Black 32, Pigment Black 33 or mixtures thereof.

In some embodiments, the pigment is lithopone, zinc sulfide, barium sulfate, cobalt oxide, yellow iron oxide, orange iron oxide, red iron oxide, brown iron oxide, hematite, black iron oxide, micaceous iron oxide, chromium (III) green, ultramarine blue, ultramarine violet, ultramarine pink, cyanide iron blue, cadmium pigments or lead chromate pigments.

In some embodiments, the pigment is complex inorganic color pigments (CICP) such as spinel pigments, rutile pigments, zircon pigments or bismuth vanadate yellow. In some embodiments, useful spinel pigments include but are not limited to: Zn(Fe,Cr)$_2$O$_4$ brown, CoAl$_2$O$_4$ blue, Co(Al-Cr)$_2$O$_4$ blue-green, Co$_2$TiO$_4$ green, CuCr$_2$O$_4$ black or (Ni,Mn,Co)(Cr,Fe)$_2$O$_4$ black. In some embodiments, useful rutile pigments include but are not limited to: Ti—Ni—Sb yellow, Ti—Mn—Sb brown, Ti—Cr—Sb buff, zircon pigments or bismuth vanadate yellow.

In another embodiment, the pigment is an organic pigment. In some embodiments, useful organic pigments include but are not limited to: Aniline black (Pigment Black 1), Anthraquinone black, Monoazo type, Diazo type, Benzimidazolones, Diarylide yellow, Monoazo yellow salts, Dinitaniline orange, Pyrazolone orange, Azo red, Naphthol red, Azo condensation pigments, Lake pigments, Copper Phthalocyanine blue, Copper Phthalocyanine green, Quinacridones, Diaryl Pyrrolopyrroles, Aminoanthraquinone pigments, Dioxazines, Isoindolinones, Isoindolines, Quinophthalones, phthalocyanine pigments, idanthrone pigments, pigment violet 1, pigment violet 3, pigment violet 19 or pigment violet 23. In yet another embodiment, the organic pigment is a Vat dye pigment, such as but not limited to: perylene, perylene black, perinones or thioindigo. A uniform dispersion of isolated, individual pigment particles (aggregates) tends to produce uniform color intensity. In some embodiments, the pigment is milled. In some embodiments, the mean particle size of the pigment is between (and optionally including) any two of the following sizes: 0.2, 0.3, 0.4, 0.5, 0.6, 0.7, 0.8, 0.9 and 1.0 µm. In some embodiments, luminescent (fluorescent or phosphorescent), or pearlescent pigments can be used, alone, or in combination with other pigments or dyes.

In one embodiment, the colorant may include low conductivity carbon black. In some embodiments, the colorant contains between and including any two of the following: 1, 5, 10, 15 and 20 wt % low conductivity carbon black. In yet another embodiment, the colorant includes about 2 to about 9 wt % low conductivity carbon black.

Low conductivity carbon black is intended to mean, channel type black, furnace black or lamp black. In some embodiments, the low conductivity carbon black is a surface oxidized carbon black. One method for assessing the extent of surface oxidation (of the carbon black) is to measure the carbon black's volatile content. The volatile content can be measured by calculating weight loss when calcined at 950° C. for 7 minutes. Generally speaking, a highly surface oxidized carbon black (high volatile content) can be readily dispersed into a polyamic acid solution (polyimide precursor), which in turn can be imidized into a (well dispersed) filled polyimide base polymer of the present disclosure. It is thought that if the carbon black particles (aggregates) are not in contact with each other, then electron tunneling, electron hopping or other electron flow mechanism are generally suppressed, resulting in lower electrical conductivity. In some embodiments, the low conductivity carbon black has a volatile content greater than or equal to 1%. In some embodiments, the low conductivity carbon black has a volatile content greater than or equal to 5, 9, or 13%. In some embodiments, furnace black may be surface treated to increase the volatile content. Typically, a low conductivity carbon black has a pH less than about 6.

A uniform dispersion of isolated, carbon black particles (aggregates) not only decreases the electrical conductivity, but additionally tends to produce uniform color intensity. In some embodiments, the low conductivity carbon black is milled. In some embodiments, the mean particle size of the low conductivity carbon black is between (and optionally including) any two of the following sizes: 0.2, 0.3, 0.4, 0.5, 0.6, 0.7, 0.8, 0.9 and 1.0 µm.

Matting Agents

In one embodiment, the polymer film contains about 0.5 to about 20 wt % of a matting agent selected from the group consisting of silica, alumina, zirconia, boron nitride, barium sulfate, polyimide particles, calcium phosphate, talc or mixtures thereof. In some embodiments, the polymer film contains between and including any two of the following: 0.5, 1, 5, 10, 15 and 20 wt % matting agent. In one embodiment, a matting agent has a particle size in the range of from about 2 to about 10 µm, or from about 3 to about 9 µm, or from about 5 to about 7 µm.

Submicron Particles

In one embodiment, the polymer film contains up to about 39 wt % of at least one submicron particle, such as a submicron fumed metal oxide (also known as pyrogenic metal oxide) or a submicron colloidal metal oxide or a mixture thereof. In some embodiments, the submicron fumed metal oxide is fumed alumina, fumed silica or mixtures thereof. The addition of a submicron fumed metal oxide surprisingly lowers the amount of colorant (such as submicron carbon black) needed in the polymer film to produce a film with an L* color less than about 30. The submicron fumed alumina and fumed silica, by themselves, in PI film, are sometimes white-ish or hazy, so it was unpredictable that their addition would actually lower the amount of colorant needed to produce deep, rich saturated colors. It is also surprising that other submicron metal oxides do not have the same effect. In one embodiment, the polymer film includes up to about 20 wt %, or up to about 10 wt % of at least one submicron particle. In one embodiment, a submicron particle has a particle size of less than about 1 µm. In one embodiment, a submicron particle has a particle size in a range of from about 0.01 to about 1 µm, or from about 0.05 to about 0.5 µm.

The particle sizes of the submicron particles, carbon blacks and matting agents can be measured in the slurries by laser diffraction using a particle size analyzer, such as a LA-930 (Horiba, Instruments, Inc., Irvine Calif.), Mastersizer 3000 (Malvern Instruments, Inc., Westborough, Mass.) or LS-230 (Beckman Coulter, Inc., Indianapolis, Ind.). However, due to the tendency of the submicron particles to flocculate, it is sometimes more accurate to measure particle size of these milled slurries by observing in an optical microscope.

Single Layer Polymer Films

The term "single layer polymer film" as used herein, refers to a layer of polymer film that has an essentially homogeneous composition throughout the layer, such that the monomers used to form the polymer are present throughout the thickness of the layer, and any fillers, such as matting agents, carbon blacks and submicron particles, are also distributed throughout the thickness of the layer. A single layer polymer film, while essentially homogeneous, may exhibit some gradation in composition of the layer over an area or through its thickness and especially at the surfaces of the film. In contrast, a polymer film that has distinct changes in composition across an area or a thickness of the film would not be a single layer polymer film. For example, a polyimide film with a core layer of one composition and thin outer layers of a different composition (such as different monomers used to form the polymer of the outer layers or different fillers in the outer layers) would not be a single layer polymer film.

In one embodiment, a single layer polymer film can include a polyimide, which can be produced by combining a diamine and a dianhydride (monomer or other polyimide precursor form) together with a solvent to form a polyamic acid (also called a polyamide acid) solution. The dianhydride and diamine can be combined in a molar ratio of about 0.90 to about 1.10. The molecular weight of the polyamic acid formed therefrom can be adjusted by adjusting the molar ratio of the dianhydride and diamine.

Useful methods for producing polymer films containing a polyimide include:

(a) A method wherein the diamine components and dianhydride components are preliminarily mixed together and then the mixture is added in portions to a solvent while stirring.

(b) A method wherein a solvent is added to a stirring mixture of diamine and dianhydride components. (contrary to (a) above)

(c) A method wherein diamines are exclusively dissolved in a solvent and then dianhydrides are added thereto at such a ratio as allowing to control the reaction rate.

(d) A method wherein the dianhydride components are exclusively dissolved in a solvent and then amine components are added thereto at such a ratio to allow control of the reaction rate.

(e) A method wherein the diamine components and the dianhydride components are separately dissolved in solvents and then these solutions are mixed in a reactor.

(f) A method wherein the polyamic acid with excessive amine component and another polyamic acid with excessive dianhydride component are preliminarily formed and then reacted with each other in a reactor, particularly in such a way as to create a non-random or block copolymer.

(g) A method wherein a specific portion of the amine components and the dianhydride components are first reacted and then the residual diamine components are reacted, or vice versa.

(h) A method wherein the components are added in part or in whole in any order to either part or whole of the solvent, also where part or all of any component can be added as a solution in part or all of the solvent.

(i) A method of first reacting one of the dianhydride components with one of the diamine components giving a first polyamic acid. Then reacting another dianhydride component with another amine component to give a second polyamic acid. Then combining the amic acids in any one of a number of ways.

In one embodiment, a polyamic acid solution can be combined with conversion chemicals like: (i) one or more dehydrating agents, such as, aliphatic acid anhydrides (acetic anhydride, etc.) and/or aromatic acid anhydrides; and (ii) one or more catalysts, such as, aliphatic tertiary amines (triethyl amine, etc.), aromatic tertiary amines (dimethyl aniline, etc.) and heterocyclic tertiary amines (pyridine, alpha, beta and gamma picoline (2-methylpyridine, 3-methylpyridine, 4-methylpyridine), isoquinoline, etc.). The anhydride dehydrating material is often used in molar excess compared to the amount of amide acid groups in the polyamic acid. The amount of acetic anhydride used is typically about 2.0 to about 4.0 moles per equivalent (repeat unit) of polyamic acid. Generally, a comparable amount of tertiary amine catalyst is used.

In one embodiment, a conversion chemical can be an imidization catalyst. Use of an imidization catalyst can help to lower the imidization temperature and shorten the imidization time. Typical imidization catalysts can range from bases such as imidazole, 1-methylimidazole, 2-methylimidazole, 1,2-dimethylimidazole, 2-phenylimidazole, benzimidazole, isoquinoline, or substituted pyridines such as methyl pyridines, lutidine, and trialkylamines. Combinations of the tertiary amines with acid anhydrides can be used. These dehydration agents, which can act as co-catalysts, include acetic anhydride, propionic anhydride, n-butyric anhydride, benzoic anhydride and others. The ratio of these catalysts and their concentration in the polyamic acid solution will influence imidization kinetics.

In one embodiment, the polyamic acid solution can be heated, optionally in the presence of the imidization catalyst, to partially or fully imidize the polyamic acid, converting it to a polyimide. Temperature, time, and the concentration and choice of imidization catalyst can impact the degree of imidization of the polyamic acid solution. Preferably, the solution should be substantially imidized. In one embodiment, for a substantially polyimide solution, greater than about 85%, greater than about 90%, or greater than about 95% of the amic acid groups are converted to the polyimide, as determined by infrared spectroscopy.

In one embodiment, a substantially polyimide solution is formed using monomers (diamines or dianhydrides) with structural characteristics important for solubility, including flexible linkages, such as, but not limited to, aliphatic spacers, ethers, thioethers, substituted amines, amides, esters, and ketones, weak intermolecular interactions, bulky substitutions, non-coplanarity, non-linearity and asymmetry. Examples of diamines that incorporate some of these characteristics are aliphatic diamines, such as HMD, CHDA and IPDA, and aromatic diamines, such as MTB TFMB, MPD, RODA, BAPP, and 3,4-ODA. Examples of dianhydrides that incorporate some of these characteristics are 6FDA, BPADA, ODPA, DSDA and BODA.

In one embodiment, the solvated mixture (the substantially imidized solution) can be mixed with a crosslinking agent and a colorant, such as a pigment or a dye, and then cast to form a single layer polyimide film. In one embodiment, the colorant may be a low conductivity carbon black. In another embodiment, the solvated mixture (the first substantially imidized solution) can be precipitated with an antisolvent, such as water or alcohols (e.g., methanol, ethanol, isopropyl alcohol). In one embodiment, the precipitate can be washed to remove the catalyst. After washing, the precipitate may be substantially dried, but need not be completely dry. The polyimide precipitate can be re-dissolved in a second solvent, such as methyl isobutyl ketone (MIBK), methyl ethyl ketone (MEK), tetrahydrofuran (THF), cyclopentanone, ethyl acetate, acetone, DMAc, NMP and mixtures thereof, to form a second substantially imidized solution (a casting solution). To the second substantially imidized solution, a crosslinking agent and a colorant can be added, which can then be cast to form a single layer polymer film. In one embodiment, a single layer polymer film contains a crosslinked polyimide in a range of from about 80 to about 99 wt %. In some embodiments, the polymer film contains between and including any two of the following: 80, 85, 90, 95 and 99 wt % crosslinked polyimide. In yet another embodiment, the polymer film contains about 91 to about 98 wt % crosslinked polyimide.

Crosslinking of the polyimide can be determined by a variety of methods. In one embodiment, the gel fraction of polyimide may be determined by using an equilibrium swelling method, comparing the weight of a dried film before and after crosslinking. In one embodiment, a crosslinked polyimide can have a gel fraction in the range of from about 20 to about 100%, or from about 40 to about 100%, or from about 50 to about 100%, or from about 70 to about 100%, or from about 85 to about 100%. In one embodiment, the crosslinked network can be identified using rheological methods. An oscillatory time sweep measurement at specific strain, frequency, and temperature can be used to confirm the formation of crosslinked network. Initially, the loss modulus (G″) value is higher than the storage modulus (G′) value, indicating that the polyimide solution behaves like a viscous liquid. Over time, the formation of a crosslinked polyimide network is evidenced by the crossover of G′ and G″ curves. The crossover, referred to as the "gel point", represents when the elastic component predominates over the viscous component and the polymer begins to behave like an elastic solid.

In one embodiment, the substantially imidized polyimide solution can be cast or applied onto a support, such as an endless belt or rotating drum, to form a film. Alternatively, it can be cast on a polymeric carrier such as polyethylene terephthalate (PET) film, other forms of Kapton® polyimide film (e.g., Kapton® HN or Kapton® OL films) or other polymeric carriers. In one embodiment, the support, or carrier layer, may be textured, such as a textured PET substrate. Next, the substantially imidized solution can be converted into a film by heating to crosslink the polyimide and partially or fully remove the solvent. The film is heated at low temperatures to initiate polyimide crosslinking and partially dry the polyimide film. Typically, temperatures below about 100° C. are used for the initial drying and crosslinking. Next, the film is heated to higher temperatures, up to about 300° C., to complete polyimide crosslinking and further remove the solvent. In some aspects of the invention, the film is separated from the carrier before drying to completion. Final drying steps can be performed with dimensional support of the film. In other aspects, the film is heated directly on the carrier.

In one embodiment, the single layer polymer film includes a polyimide with a low refractive index, such as less than about 1.74, or less than about 1.69, or less than about 1.60. Lowering the refractive index of the polyimide enables the formation of single layer polymer films with both low L* and gloss. Conventional polyimides exhibit considerably higher refractive indices (RI) due to the high contents of aromatic rings and imide structures than other common optical polymers. However, their poor transparency in the visible region is a serious obstacle for light trapping, raising the reflection from the film surface. The optical absorption of polyimides in the visible region is mainly caused by the intra- and intermolecular charge-transfer (CT) interactions between the electron-donating diamine and the electron-accepting dianhydride moieties. In one embodiment, the average refractive index, $n_{av}$, of a material can be estimated by the Lorentz-Lorenz equation:

$$\frac{n_{av}^2-1}{n_{av}^2+2} = \frac{4\pi}{3}\frac{\alpha_{av}}{V_{int}} = \frac{4\pi}{3}\frac{\rho N_A}{M}\alpha_{av}$$

where $\alpha_{av}$ is the average molecular polarizability, $V_{int}$ is the intrinsic volume of the repeat unit, $\rho$ is the density, NA is Avogadro's number and M is the molecular weight. This equation can be simplified to:

$$\frac{n_{av}^2-1}{n_{av}^2+2} = \frac{4\pi}{3}K_p\frac{\alpha_{av}}{V_{vdw}}$$

In which $K_p$ is the molecular packing coefficient and $V_{vdw}$ is the molecular van der Waals volume (see Y. Terui and S. Ando, *J Polym Sci: Part B Polymer Physics*, 42, 2354-2366 (2004)). Based on this equation, one method to minimize the refractive index of a polymer formulation is by minimizing the contribution from the $\alpha_{av}/V_{vdw}$ ratio. The variables of this ratio can be calculated empirically, semi-empirically or from ab initio principles. Utilizing this calculated ratio, monomers can be selected or eliminated to target a low refractive index. The aim is to decrease the polarizability of polyimide molecular chains, thus reducing the refractive indices of the polymer. The polarizability of polymers can be reduced by the introduction of electron withdrawing fluorine atoms or fluorinated substituents, the incorporation of alicyclic moieties, and the modification of the molecular skeleton by meta-substituted structures and bulky side chain groups.

In one embodiment, a single layer polymer film with can have an L* of about 30 or less and a 60° gloss (60GU) of about 15 or less. In one embodiment, a single layer polymer film can have an L* of about 25 or less or about 20 or less. In one embodiment, a single layer polymer film can have a 60° gloss of about 10 or less or about 8 or less or about 6 or less.

The thickness of the single layer polymer film may be adjusted, depending on the intended purpose of the film or final application specifications. In one embodiment, the single layer polymer film has a total thickness in a range of from about 2 to about 125 µm, or from about 4 to about 50 µm, or from about 5 to about 20 µm.

In one embodiment, a single layer polymer film can be textured using mechanical or chemical means. In one embodiment, mechanical texturing can include processes that physically remove portions of the film surface, such as sand blasting or laser ablation. In one embodiment, for sand blasting, a single layer polymer film can be textured by spraying the surface of the film with minute sands in an abrasive-blasting (centrifugal-blasting) process, in which rotating impellers spray the sand using centrifugal force. In one embodiment, texturing can be provided through embossing or imprinting a texture onto the film surface. In one embodiment, for imprinting, a single layer polymer film can be textured by casting the film onto a textured surface wherein the texture is transferred to the polymer film surface. In one embodiment, chemical texturing can be provided through lithography.

In one embodiment, a textured film can have both low L* color and low gloss even though the film does not contain a matting agent. In one embodiment, a single layer polymer film with a textured surface can have a maximum roughness ($S_{pv}$) of about 6 µm or more, an L* of about 30 or less and a 60° gloss (60GU) of about 15 or less. In one embodiment, the single layer polymer film with a textured surface can have an $S_{pv}$ of about 7 µm or more or about 8 µm or more. In one embodiment, a single layer polymer film with a textured surface can have an L* of about 25 or less or about 20 or less. In one embodiment, a single layer polymer film with a textured surface can have a 60° gloss of about 10 or less or about 8 or less or about 6 or less. In one embodiment, both sides of a single layer polymer film can have a textured surface.

Applications

In one embodiment, a single layer polymer film can be used in electronic device applications, such as a coverlay for a printed circuit board or other electronic components in an electronic device, providing protection from physical damage, oxidation and other contaminants that may adversely affect the function of the electronic components. Very thin coverlays of single layer polymer films using crosslinked polyimide are more chemically resistant and can resist etching during the pumice, desmear, and plasma processes used in circuit production, while maintaining good optical properties.

The advantageous properties of this invention can be observed by reference to the following examples that illustrate, but do not limit, the invention. All parts and percentages are by weight unless otherwise indicated.

EXAMPLES

Test Methods

CIE L*, a*, b* Color

Color measurements were performed using a ColorQuest® XE dual-beam spectrophotometer (Hunter Associates Laboratory, Inc., Reston, Va.), in the reflectance, specular included mode. The instrument was standardized prior to each use. Color data from the instrument were reported in the CIELAB 10°/D65 system, as L*, a*, b*. A L* value of 0 is pure black, while a L* value of 100 is pure white. Typically, a L* value difference of 1 unit is discernible to the eye.

Refractive Index

Refractive index measurements were performed using a Metricon® Model 2010 Prism Coupler (Metricon Corporation, Pennington, N.J.) using a laser wavelength of 633 nm (632.8 nm). The instrument was referenced prior to each use. Refractive index measurements were performed in transverse electric mode to report refractive index in the plane of the film.

Gel Fraction

Polyimide gel fraction was measured using a Soxhlet extraction method (Soxhlet). A polymer film sample was placed in a glass thimble, which was placed in a Soxhlet extractor main chamber sitting above a nitrogen purged, solvent filled round bottom flask. The extraction solvent (DMAc) was continuously cycled through the sample by boiling and condensation. After sufficient heat was applied to round bottom flask, solvent in vapor form was transported to main chamber of the Soxhlet extractor and condenses. After reaching an overflow level, the solvent was drained by a siphon tube back to round bottom flask.

Polymer films of ~2×3 inches were used. Film sample were wiped clean with acetone, air dried, weighed, and creased before placing in the glass thimble. The temperature of the DMAc (~300 ml) was set to between 165 and 175° C. and extraction was carried out throughout a period of at least 7 hours. Afterwards, the sample was retrieved from the apparatus, dried on a hot plate at 50° C. for up to 1 hour, and placed in a furnace at 120° C. The furnace was heated from 120 to 250° C. (16° C./min), then held at 250° C. for 20 minutes. The film was removed "hot" from the oven after heating to 250° C. for 20 minutes and allowed to cool in air, and the sample was weighed again. Fresh solvent was used for each sample.

60° Gloss

60° gloss (60GU) was measured using a Micro-TRI-gloss glossmeter (BYK— Gardner USA, Columbia, Md.). This instrument was calibrated prior to each use.

Particle Size

Particle size of filler particles in the slurries was measured by laser diffraction using a particle size analyzer (Mastersizer 3000, Malvern Instruments, Inc., Westborough, Mass.). DMAc was used as the carrier fluid.

Surface Roughness

Surface roughness was measured using a ZeGage™ Pro 3D optical profiler (Zygo Corp., Middlefield, Conn.) over a 167×167 µm area (0.28 mm²). The maximum roughness ($S_{pv}$, $S_z$ or $R_z$) is the sum of the maximum peak height ($S_p$) and the maximum valley depth ($S_v$) of the surface being measured, $S_{pv}=S_p+S_v$.

Low Conductivity Carbon Black

A carbon black solution was prepared, consisting of 90 wt % DMAc and 10 wt % carbon black powder (Special Black 4, SB4, Orion Engineered Carbons LLC, Kingwood, Tex.). The ingredients were thoroughly mixed using a handheld high-shear mixer.

Comparative Example 1 and Example 1

For Comparative Example 1 and Example 1 (CE1 and E1), a soluble thermoplastic polyimide (Matrimid® 9725, Huntsman Corp., The Woodlands, Tex.), with a monomer composition of 3,3',4,4'-benzophenone tetracarboxylic dianhydride//3-(4-aminophenyl)-1,1,3-trimethyl-5-indanamine (BTDA 1.0//PIDA 1.0), was used as a dry powder.

For CE1, 5 g of the dried polymer resin was added to 17.4 g of dimethyl acetamide (DMAc, HPLC grade) and mixed in a centrifugal-planetary mixer (THINKY USA, Laguna Hills, Calif.) to obtain a solution. The solution was de-gassed using the centrifugal-planetary mixer to force the gas from the polymer at 2000 rpm for 10 minutes. 2.5 g of a 10 wt % solution of SB4 carbon (Orion Engineered Carbons) in DMAc were added to the polyimide solution along with a release agent to facilitate removal of the film from the casting substrate. The solution was mixed using the centrifugal-planetary mixer at 2200 rpm for 2 minutes followed by de-gassing at 2000 rpm for 5 minutes.

The solution was cast onto a matte PET substrate (Kaisei Industries, Inc., Japan) at 25° C. to produce 1-2 mil cured films. The film on the matte PET substrate was heated to 80° C. for 15 minutes and was subsequently lifted off the matte PET surface and mounted onto an 8×12 inch frame. The mounted film was placed in a furnace. The furnace was heated from 120 to 250° C. (16° C./min), then held at 250° C. for 20 minutes. The film was removed "hot" from the oven after heating to 250° C. for 20 minutes and allowed to cool in air.

For E1, a polyimide solution with carbon black was prepared as described above for CE1. Before the final degassing step, 1.04 g of a 10 wt % solution of Jeffamine® D-230 (Huntsman) in DMAc was added to the polymer solution. The solution was mixed using the centrifugal-planetary mixer at 2200 rpm for 30 seconds while chilled in a cold cup followed by de-gassing at 2000 rpm for 5 minutes, held at the cold temperature.

The solution was cast onto a matte PET substrate at 25° C. to produce 1-2 mil cured films. The film on the matte PET substrate was heated to 80° C. for 10 minutes and was subsequently lifted off the matte PET surface and mounted onto an 8×12 inch frame. The mounted film was placed in a furnace and heated as described above for CE1.

Comparative Example 2 and Example 2

For the polyamic acid (PAA) solution of Comparative Examples 2 and Example 2 (CE2 and E2) with a monomer composition of BPADA 1.0//PIDA 1.0, into a 300-ml beaker in a nitrogen purged glove box 6.77 g of 3-(4-aminophenyl)-1,1,3-trimethyl-5-indanamine (PIDA, Changzhou Sunlight Pharmaceutical Co., Ltd., China) was added along with 180 g of DMAc. 13.20 g of 4,4'-Bisphenol A dianhydride (BPADA, Sabic, Riyadh, Saudi Arabia) was added in three aliquots over three 5-10 minute intervals. The reaction mixture was held at 40° C. during these additions. The reaction was held at 40° C. overnight to a weight average molecular weight, $M_w$=284,000 g/mol with a dispersity of 1.85.

For CE2 and E2, to prepare a substantially imidized polyimide solution (polyimide amic acid solution), 9.47 g of beta-picoline (Sigma Aldrich, Milwaukee, Wis.) and 10.38 g of acetic anhydride (Sigma Aldrich) were combined with the PAA solution. The reaction mixture was stirred at 40° C. for 30 minutes then heated to 80° C. for 3 hours to imidize the solution. 200 g of room temperature polymer solution was poured into 600 ml of methanol (Sigma Aldrich) in a blender and rapidly stirred to pulverize the polymer solid. The pulverized polymer solid was allowed to stir in the blender for 10 minutes before collection by filtration. The polymer was air dried overnight and then further dried under vacuum at 35° C. overnight.

For CE2, a polyimide solution with carbon black was prepared and cast and heated to form a film as described above for CE1.

For E2, a polyimide solution with carbon black was prepared as described above for CE1. Before the final degassing step, 0.77 g of a 10 wt % solution of Jeffamine® D-230 in DMAc was added to the polymer solution. The solution was mixed using the centrifugal-planetary mixer at 2200 rpm for 30 seconds while chilled in a cold cup followed by de-gassing at 2000 rpm for 5 minutes, held at the cold temperature.

The solution was cast onto a matte PET substrate at 25° C. to produce ~2.5 mil cured films. The film on the matte PET substrate was heated to 80° C. for 15 minutes and was subsequently lifted off the matte PET surface and mounted onto an 8×12 inch frame. The mounted film was placed in a furnace and heated as described above for CE1.

Table 1 summarizes the properties of E1-E2 and CE1-CE2. While all of E1-E2 and CE1-CE2 show good color and gloss properties, the crosslinked films (E1 and E2) have superior chemical resistance, as demonstrated by gel fraction measurements. In addition, the 60GU of the crosslinked films are lower than their non-crosslinked counterparts.

TABLE 1

| Example | RI | Colorant (wt %) | Crosslinker (mol %) | Gel Fraction (%) | L* | 60GU | $S_{pv}$ | Thickness (μm) |
|---|---|---|---|---|---|---|---|---|
| CE1 | 1.62 | 5 | 0 | 0 | 28.70 | 4.4 | 9.603 | 41.7 |
| E1 | 1.62 | 5 | 5 | 65 | 28.09 | 3.6 | 7.959 | 41.4 |
| CE2 | 1.62 | 5 | 0 | 0 | 28.97 | 4.5 | 6.898 | 34.3 |
| E2 | 1.62 | 5 | 5 | 47 | 29.25 | 3.6 | 8.831 | 64.0 |
| CE3 | 1.62 | 5 | 10 | 87 | 29.76 | 112 | 1.213 | 31.8 |

Comparative Example 3

For Comparative Example 3 (CE3), the Matrimid® 9725 polymer, as used in CE1 and E1, was used as a dry powder.

For CE3, 2.5 g of the dried polymer resin was added to 8.7 g of DMAc and mixed in the centrifugal-planetary mixer to obtain a solution. The solution was de-gassed using the centrifugal-planetary mixer to force the gas from the polymer at 2000 rpm for 10 minutes. 0.05 g of a 2.5 wt % solution of triphenyl phosphite belt release agent in DMAc and 1.25 g of a 10 wt % solution of SB4 carbon in DMAc were added to the polyimide solution. The solution was mixed using the centrifugal-planetary mixer at 2200 rpm for 2 minutes followed by de-gassing at 2000 rpm for 10 minutes. 1.04 g of a 10 wt % solution of Jeffamine® D-230 in DMAc was added to the polymer solution. The solution was mixed using the centrifugal-planetary mixer at 2200 rpm for 30 seconds while chilled in a cold cup followed by de-gassing at 2000 rpm for 5 minutes, held at the cold temperature.

The solution was cast onto a Mylar® polyester film (DuPont Teijin Films USA, Chester, Va.) substrate at 25° C.

to produce 1-2 mil cured films. The film on the substrate was heated to 80° C. for 15 minutes and was subsequently lifted off the polyester film surface and mounted onto an 8×12 inch frame. The mounted film was placed in a furnace and heated as described above for CE1. Casting of the polyimide on the smooth surface (low Spy) of the Mylar® polyester film results in a polymer film with high gloss, despite its high degree of crosslinking (see Table 1).

Example 3

For the polyamic acid (PAA) solution of Example 3 (E3), with a monomer composition of CBDA 0.6/6FDA 0.4// TFMB 1.0, into a 72-L nitrogen purged resin kettle, 2.268 kg of trifluoromethyl-benzidine (TFMB, Seika Corp., Wakayama Seika Kogyo Co., LTD., Japan) was added along with 32.191 kg of DMAc. 1.252 kg of 4,4'-(hexafluoroisopropylidene)diphthalic anhydride (6FDA, Daikin America Incorporated, Decatur, Ala.) and 0.829 kg of cyclobutane dianhydride (CBDA, Wilshire Technologies, Princeton, N.J.) were added in three aliquots over three 60 minute intervals. The reaction mixture was held at 40° C. during these additions. The polymer was polymerized ("finished") to 12 poise using small additions of 6FDA powder.

For E3, to prepare a substantially imidized polyimide solution (polyimide amic acid solution), an additional 2.787 kg of DMAc was added and stirred for 60 minutes. 1.65 kg of beta-picoline and 1.808 kg of acetic anhydride were combined with the PAA solution. The reaction mixture was heated to 80° C. for 2 hours to imidize the solution. 1,000 g of room temperature polymer solution was poured into 2 L of methanol in a blender and rapidly stirred to pulverize the polymer solid. The pulverized polymer solid was allowed to stir in the blender for 10 minutes before collection by filtration. The polymer was air dried overnight and then further dried under vacuum at 50° C. overnight.

For E3, 2.5 g of the dried polymer was added to 21.2 g of DMAc and mixed in the centrifugal-planetary mixer to obtain a solution. The solution was de-gassed using the centrifugal-planetary mixer to force the gas from the polymer at 2000 rpm for 10 minutes. 0.05 g of a 2.5 wt % solution of triphenyl phosphite belt release agent in DMAc and 1.25 g of a 10 wt % solution of SB4 carbon in DMAc were added to the polyimide solution. The solution was mixed using the centrifugal-planetary mixer at 2200 rpm for 2 minutes. 0.5 g of a 10 wt % solution of Jeffamine® D-230 in DMAc was added to the polymer solution. The solution was mixed using the centrifugal-planetary mixer at 2200 rpm for 30 seconds while chilled in a cold cup followed by de-gassing at 2000 rpm for 5 minutes, held at the cold temperature.

The solution was cast onto a matte PET substrate at 25° C. to produce 1-2 mil cured films as described above for CE1.

Example 4

For the polyamic acid (PAA) solution of Example 4 (E4) with a monomer composition of BPADA 1.0//3,4-ODA 1.0, into a 300-ml beaker in a nitrogen purged glove box, 5.56 g of 3,4-oxydiphenylamine (3,4-ODA, Seika Corp., Wakayama Seika Kogyo Co., LTD., Japan) was added along with 180 g of DMAc. 14.415 g of BPADA were added in three aliquots over three 5-10 minute intervals. The reaction mixture was held at 40° C. during these additions. The reaction was held at 40° C. overnight to a weight average molecular weight, $M_w$=184,000 g/mol with a dispersity of 2.00.

For E4, to prepare a substantially imidized polyimide solution (polyimide amic acid solution), 10.34 g of beta-picoline and 11.33 g of acetic anhydride were combined with the PAA solution. The reaction mixture was stirred at 40° C. for 30 minutes then heated to 80° C. for 3 hours to imidize the solution. 200 g of room temperature polymer solution was poured into 600 ml of methanol in a blender and rapidly stirred to pulverize the polymer solid. The pulverized polymer solid was allowed to stir in the blender for 10 minutes before collection by filtration. The polymer was air dried overnight and then further dried under vacuum at 35° C. overnight.

For E4, 2.5 g of the dried polymer was added to 8.7 g of DMAc and mixed in the centrifugal-planetary mixer to obtain a solution. The solution was de-gassed using the centrifugal-planetary mixer to force the gas from the polymer at 2000 rpm for 10 minutes. 0.05 g of a 2.5 wt % solution of triphenyl phosphite belt release agent in DMAc and 1.25 g of a 10 wt % solution of SB4 carbon in DMAc were added to the polyimide solution. The solution was mixed using the centrifugal-planetary mixer at 2200 rpm for 2 minutes. 0.42 g of a 10 wt % solution of Jeffamine® D-230 in DMAc was added to the polymer solution. The solution was mixed using the centrifugal-planetary mixer at 2200 rpm for 30 seconds while chilled in a cold cup followed by de-gassing at 2000 rpm for 5 minutes, held at the cold temperature.

The solution was cast onto a matte PET substrate at 25° C. to produce 1-2 mil cured films as described above for CE1.

Example 5

For the polyamic acid (PAA) solution of Example 5 (E5) with a monomer composition of BPADA 1.0//RODA 1.0, into a 300-ml beaker in a nitrogen purged glove box, 8.647 g of 1,3-bis(4-aminophonoxy)benzene (RODA) was added along with 180 g of DMAc. 8.630 g of BPADA were added in smaller aliquots, and stirred until fully dissolved. The reaction mixture was held at 40° C. during these additions. The reaction was held at 40° C. overnight to a weight average molecular weight, $M_w$=184,000 g/mol with a dispersity of 2.00.

For E5, to prepare a substantially imidized polyimide solution (polyimide amic acid solution), to the PAA solution, an additional 17.0 g of DMAc was added, along with 10.31 g of beta-picoline and 11.31 g of acetic anhydride. The reaction was stirred at room temperature for approximately two hours. Within this time, the viscosity of solution increased slightly and an additional 50 ml of DMAc was added. The solution was left to stir overnight.

200 g of the polymer solution was mixed with approximately 600 ml of methanol and mixed in a laboratory blender until producing fine powder solid particles. The resulting suspension was then filtered, air dried overnight at room temperature, and vacuum dried at 50° C. overnight.

For E5, 2.5 g of the dried polymer was added to 12.9 g of DMAc and mixed in the centrifugal-planetary mixer to obtain a solution. The solution was de-gassed using the centrifugal-planetary mixer to force the gas from the polymer at 2000 rpm for 10 minutes. 0.05 g of a 2.5 wt % solution of triphenyl phosphite belt release agent in DMAc and 1.25 g of a 10 wt % solution of SB4 carbon in DMAc were added to the polyimide solution. The solution was mixed using the centrifugal-planetary mixer at 2200 rpm for 2 minutes. 0.42 g of a 10 wt % solution of Jeffamine® D-230 in DMAc was added to the polymer solution. The solution was mixed using the centrifugal-planetary mixer at 2200 rpm for 30 seconds while chilled in a cold cup followed by de-gassing at 2000 rpm for 5 minutes, held at the cold temperature.

The solution was cast onto a matte PET substrate at 25° C. to produce 1-2 mil cured films as described above for CE1.

Example 6

For Example 6 (E6), the Matrimid® 9725 polymer, as used in CE1 and E1, was used as a dry powder.

For E6, 2.5 g of the dried polymer resin was added to 8.7 g of DMAc and mixed in the centrifugal-planetary mixer to obtain a solution. The solution was de-gassed using the centrifugal-planetary mixer to force the gas from the polymer at 2000 rpm for 10 minutes. 0.05 g of a 2.5 wt % solution of triphenyl phosphite belt release agent in DMAc and 1.25 g of a 10 wt % solution of SB4 carbon in DMAc were added to the polyimide solution. The solution was mixed using the centrifugal-planetary mixer at 2200 rpm for 2 minutes followed by de-gassing at 2000 rpm for 10 minutes. 2.08 g of a 10 wt % solution of Jeffamine® D-230 in DMAc was added to the polymer solution. The solution was mixed using the centrifugal-planetary mixer at 2200 rpm for 30 seconds while chilled in a cold cup followed by de-gassing at 2000 rpm for 5 minutes, held at the cold temperature.

The solution was cast onto a matte PET substrate at 25° C. to produce 1-2 mil cured films as described above for CE1.

Example 7

For Example 7 (E7), the Matrimid® 9725 polymer, as used in CE1 and E1, was used as a dry powder.

For E7, 2.5 g of the dried polymer resin was added to 8.7 g of DMAc and mixed in the centrifugal-planetary mixer to obtain a solution. The solution was de-gassed using the centrifugal-planetary mixer to force the gas from the polymer at 2000 rpm for 10 minutes. 0.05 g of a 2.5 wt % solution of triphenyl phosphite belt release agent in DMAc and 1.25 g of a 10 wt % solution of SB4 carbon in DMAc were added to the polyimide solution. The solution was mixed using the centrifugal-planetary mixer at 2200 rpm for 2 minutes followed by de-gassing at 2000 rpm for 10 minutes. 0.66 g of a 10 wt % solution of Jeffamine® T-403 (Huntsman) in DMAc was added to the polymer solution. The solution was mixed using the centrifugal-planetary mixer at 2200 rpm for 30 seconds while chilled in a cold cup followed by de-gassing at 2000 rpm for 5 minutes, held at the cold temperature.

The solution was cast onto a matte PET substrate at 25° C. to produce 1-2 mil cured films as described above for CE1.

Example 8

For Example 8 (E8), the Matrimid® 9725 polymer, as used in CE1 and E1, was used as a dry powder.

For E8, 2.5 g of the dried polymer resin was added to 8.7 g of DMAc and mixed in the centrifugal-planetary mixer. The solution was de-gassed using the centrifugal-planetary mixer to force the gas from the polymer at 2000 rpm for 10 minutes. 0.05 g of a 2.5 wt % solution of triphenyl phosphite belt release agent in DMAc and 1.25 g of a 10 wt % solution of SB4 carbon in DMAc were added to the polyimide solution. The solution was mixed using the centrifugal-planetary mixer at 2200 rpm for 2 minutes followed by de-gassing at 2000 rpm for 10 minutes. 0.31 g of a 10 wt % solution of m-xylylenediamine (MXD, Sigma Aldrich, Milwaukee, Wis.) in DMAc was added to the polymer solution. The solution was mixed using the centrifugal-planetary mixer at 2200 rpm for 30 seconds while chilled in a cold cup followed by de-gassing at 2000 rpm for 5 minutes, held at the cold temperature.

The solution was cast onto a matte PET substrate at 25° C. to produce 1-2 mil cured films as described above for CE1.

Example 9

For Example 9 (E9), the Matrimid® 9725 polymer, as used in CE1 and E1, was used as a dry powder.

For E9, 2.5 g of the dried polymer resin was added to 4.95 g of DMAc and mixed in the centrifugal-planetary mixer to obtain a solution. The solution was de-gassed using the centrifugal-planetary mixer to force the gas from the polymer at 2000 rpm for 10 minutes. 0.05 g of a 2.5 wt % solution of triphenyl phosphite belt release agent in DMAc and 5 g of a 10 wt % solution of perylene black (Paliogen® Black L 0086, BASF SE, Germany) in DMAc were added to the polyimide solution. The solution was mixed using the centrifugal-planetary mixer at 2200 rpm for 2 minutes followed by de-gassing at 2000 rpm for 10 minutes. 1.04 g of a 10 wt % solution of Jeffamine® D-230 in DMAc was added to the polymer solution. The solution was mixed using the centrifugal-planetary mixer at 2200 rpm for 30 seconds while chilled in a cold cup followed by de-gassing at 2000 rpm for 5 minutes, held at the cold temperature.

The solution was cast onto a matte PET substrate at 25° C. to produce 1-2 mil cured films as described above for CE1.

Example 10

For Example 10 (E10), the Matrimid® 9725 polymer, as used in CE1 and E1, was used as a dry powder.

For E10, 2.5 g of the dried polymer resin was added to 7.45 g of DMAc and mixed in the centrifugal-planetary mixer to obtain a solution. The solution was de-gassed using the centrifugal-planetary mixer to force the gas from the polymer at 2000 rpm for 10 minutes. 0.05 g of a 2.5 wt % solution of triphenyl phosphite belt release agent in DMAc, 1.25 g of a 10 wt % solution of SB4 carbon in DMAc, and 1.25 g of a 10 wt % solution of silica matting agent (Syloid® C807, W.R. Grace & Co., Columbia, Md.) in DMAc were added to the polyimide solution. The solution was mixed using the centrifugal-planetary mixer at 2200 rpm for 2 minutes followed by de-gassing at 2000 rpm for 10 minutes. 1.04 g of a 10 wt % solution of Jeffamine® D-230 in DMAc was added to the polymer solution. The solution was mixed using the centrifugal-planetary mixer at 2200 rpm for 30 seconds while chilled in a cold cup followed by de-gassing at 2000 rpm for 5 minutes, held at the cold temperature.

The solution was cast onto a matte PET substrate at 25° C. to produce 1-2 mil cured films as described above for CE1. E3-E10, as summarized in Table 2, demonstrate a range of crosslinked polymers with low refractive index, having low color and gloss for films with sufficient surface roughness.

Comparative Example 4

For the polyamic acid solution of Comparative Example 4 (CE4), with a monomer composition of BPDA 1.0//PPD 1.0, into a 300-ml nitrogen purged reaction vessel, 10.95 g of p-phenylenediamine (PPD) was added along with 160.17 g anhydrous DMAc. 28.89 g of 3,3',4,4'-biphenyl tetracarboxylic dianhydride (BPDA) was added over a period of several minutes. The reaction mixture was stirred until all monomers were reacted. The total stoichiometric ratio of dianhydride to diamine was approximately 0.97:1. The mixture achieved a polymer viscosity of 75-250 Poise at approximately 20% polyamic acid solids. The polymer was polymerized ("finished") to increase the molecular weight and provide the desired viscosity using small additions of PMDA solution in DMAc. The polymer solution was stored in a freezer until use.

A solution was prepared by adding 8.42 g of a 10 wt % solution of SB4 carbon in DMAc to 91.58 g of the polymer solution and mixed in the centrifugal-planetary mixer. The solution was cast onto a matte PET substrate at 25° C. to produce 1-2 mil cured films. The film on the matte PET substrate was heated at 90° C. for 20 minutes and was subsequently lifted off the matte PET surface and mounted onto an 8×12-inch frame. The mounted films were placed in a furnace. The furnace was heated from 120 to 320° C. (16° C./min) then the film was removed "hot" from the oven and placed in another at 400° C. for 5 minutes, before removing and cooling in air.

Comparative Example 5

For the polyamic acid solution of Comparative Example 5 (CE5), with a monomer composition of ODPA 0.5/PMDA 0.5//MPD 0.5/BAPP 0.5, into a 300-ml nitrogen purged reaction vessel, 20.48 g of 2,2-Bis[4-(4-aminophenoxy)phenyl]propane (BAPP) and 5.40 g of m-Phenylenediamine (MPD) were added along with 148.2 g of DMAc. 10.45 g of pyromellitic dianhydride (PMDA) and 15.48 g of 4,4'-oxydiphthalic anhydride (ODPA) were added over a period of several minutes. The reaction mixture was stirred until all monomers were reacted. The total stoichiometric ratio of dianhydride to diamine was approximately 0.98:1. The mixture achieved a polymer viscosity of 75-250 Poise at approximately 26% polyamic acid solids. The polymer was polymerized ("finished") to increase the molecular weight and provide the desired viscosity using small additions of PMDA solution in DMAc. The polymer solution was stored in a freezer until use.

A solution was prepared by adding 11.84 g of a 10 wt % solution of SB4 carbon in DMAc to 88.64 g of the polymer solution and mixed in the centrifugal-planetary mixer. The solution was cast onto a matte PET substrate at 25° C. to produce 1-2 mil cured films. The film on the matte PET substrate was heated at 90° C. for 20 minutes and was subsequently lifted off the matte PET surface and mounted onto an 8×12-inch frame. The mounted films were placed in a furnace. The furnace was heated from 120 to 350° C. (16° C./min) then the film was removed "hot" from the oven and allowed to cool in air. CE4 and CE5, as summarized in Table 2, demonstrate the challenge of achieving both low color and low gloss in a single layer polymer film when the refractive index in too high, CE4, or the surface roughness is too low, CE5.

TABLE 2

| Example | RI | Colorant (wt %) | Crosslinker (mol %) | Gel Fraction (%) | L* | 60GU | $S_{pv}$ | Thickness (μm) |
|---|---|---|---|---|---|---|---|---|
| E3 | 1.51 | 5 | 5 | 73 | 27.26 | 4.9 | 11.998 | 23.6 |
| E4 | 1.65 | 5 | 5 | 29 | 29.35 | 3.8 | 10.832 | 35.1 |
| E5 | 1.67 | 5 | 5 | 60 | 29.97 | 13.8 | 11.76 | 25.4 |
| E6 | 1.62 | 5 | 20 | 95 | 28.75 | 5.2 | 10.77 | 18.3 |
| E7 | 1.62 | 5 | 5 | 79 | 29.14 | 5.3 | 12.621 | 33.3 |
| E8 | 1.62 | 5 | 5 | 72 | 28.27 | 4.1 | 11.466 | 21.6 |
| E9 | 1.62 | 20 | 10 | 54 | 29.04 | 5.1 | 12.693 | 39.4 |
| E10 | 1.62 | 5 | 10 | 86 | 28.74 | 4 | 12.508 | 36.6 |
| CE4 | 1.8 | 5 | 0 | N/A | 33.89 | 13.9 | 7.36 | 32.3 |
| CE5 | 1.67 | 5 | 0 | N/A | 29.15 | 38.6 | 4.84 | 40.9 |

Note that not all of the activities described above in the general description are required, that a portion of a specific activity may not be required, and that further activities may be performed in addition to those described. Still further, the order in which each of the activities are listed are not necessarily the order in which they are performed. After reading this specification, skilled artisans will be capable of determining what activities can be used for their specific needs or desires.

In the foregoing specification, the invention has been described with reference to specific embodiments. However, one of ordinary skill in the art appreciates that various modifications and changes can be made without departing from the scope of the invention as set forth in the claims below. All features disclosed in this specification may be replaced by alternative features serving the same, equivalent or similar purpose.

Accordingly, the specification is to be regarded in an illustrative rather than a restrictive sense and all such modifications are intended to be included within the scope of the invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A single layer polymer film comprising:
   60 to 99 wt % of a crosslinked polyimide having a gel fraction in the range of from 20 to 100% and a refractive index of 1.74 or less; and
   1 to 40 wt % of a colorant, wherein a surface of the single layer polymer film has been textured and has a maximum roughness ($S_{pv}$) of 6 μm or more, an L* color of 30 or less and a 60° gloss of 15 or less.

2. The single layer polymer film of claim 1, further comprising a matting agent.

3. The single layer polymer film of claim 1, wherein the crosslinked polyimide comprises a dianhydride selected from the group consisting of aromatic dianhydrides, aliphatic dianhydrides and mixtures thereof.

4. The single layer polymer film of claim 3, wherein the dianhydride is selected from the group consisting of 4,4'-(hexafluoroisopropylidene) diphthalic anhydride (6FDA), cyclobutane dianhydride (CBDA), 3,3',4,4'-benzophenone tetracarboxylic dianhydride (BTDA), bisphenol A dianhydride (BPADA), 4,4'-oxydiphtalic anhydride (ODPA), bis (3,4-dicarboxyphenyl) sulfoxide dianhydride (DSDA) and hexahydro-4,8-ethano-1H,3H-benzo[1,2-c:4,5-c']difuran-1,3,5,7-tetrone (BODA) and mixtures thereof.

5. The single layer polymer film of claim 1, wherein the crosslinked polyimide comprises a diamine selected from the group consisting of aromatic diamines, aliphatic diamines and mixtures thereof.

6. The single layer polymer film of claim 5, wherein the diamine is selected from the group consisting of 1,6-hexamethylenediamine (HMD), trans-1,4-diaminocyclohexane (CHDA), 3-(4-aminophenyl)-1,1,3-trimethyl-5-indanamine (PIDA), isophoronediamine (IPDA), m-tolidine (MTB), 2,2'-bis(trifluoromethyl) benzidine (TFMB), m-phenylenediamine (MPD), 1,3-bis-(4-aminophenoxy) benzene (RODA), 2,2-bis-(4-[4-aminophenoxy]phenyl) propane (BAPP), and 3,4'-diaminodiphenyl ether (3,4-ODA) and mixtures thereof.

7. The single layer polymer film of claim 1, wherein the single layer polymer film has a thickness in the range of from 2 to 125 µm.

8. The single layer polymer film of claim 1, wherein the crosslinked polyimide has a refractive index of 1.69 or less.

9. The single layer polymer film of claim 1, wherein the colorant comprises a low conductivity carbon black.

10. A coverlay for a printed circuit board comprising the single layer polymer film of claim 1.

11. A process for forming a single layer polymer film comprising a crosslinked polyimide film comprising a dianhydride and a diamine, wherein:
 the dianhydride, the diamine or both the dianhydride and the diamine comprise an alicyclic monomer, an aliphatic monomer or both an alicyclic monomer and an aliphatic monomer;
 the polymer film has an L* color of 30 or less and a 60° gloss of 15 or less; and
 the crosslinked polyimide film is formed by:
  (a) polymerizing the dianhydride and the diamine in the presence of a solvent to obtain a polyamic acid solution;
  (b) imidizing the polyamic acid solution to form a substantially imidized solution;
  (c) adding a crosslinking agent and a colorant to the substantially imidized solution;
  (d) casting the substantially imidized solution on a removeable substrate having a textured surface with a maximum roughness ($S_{pv}$) of 6 µm or more to form a film;
  (e) crosslinking the polyimide while drying the film; and
  (f) removing the single layer polymer film from the textured substrate.

12. A process for forming a single layer polymer film comprising a crosslinked polyimide film comprising a dianhydride and a diamine, wherein:
 the dianhydride, the diamine or both the dianhydride and the diamine comprise an alicyclic monomer, an aliphatic monomer or both an alicyclic monomer and an aliphatic monomer;
 the polymer film has an L* color of 30 or less and a 60° gloss of 15 or less; and
 the crosslinked polyimide film is formed by:
  (a) polymerizing the dianhydride and the diamine in the presence of a first solvent to obtain a polyamic acid solution;
  (b) imidizing the polyamic acid solution to form a first substantially imidized solution;
  (c) precipitating the first substantially imidized solution with an antisolvent;
  (d) filtering and drying the first substantially imidized solution to obtain a solid polyimide resin;
  (e) dissolving the solid polyimide resin in a second solvent and adding a crosslinking agent and a low conductivity carbon black to form a second substantially imidized solution;
  (f) casting the second substantially imidized solution on a removeable substrate having a textured surface with a maximum roughness ($S_{pv}$) of 6 µm or more to form a film;
  (g) crosslinking the polyimide while drying the film; and
  (h) removing the single layer polymer film from the textured substrate.

13. The process of claim 12, wherein after (e) and before (f), the second substantially imidized solution is filtered to remove insoluble constituents of the solution.

14. The process of claim 12, wherein the first and second solvents are the same or different.

* * * * *